April 23, 1968   J. R. STASIELUK   3,379,319
DRAFT GEAR
Filed Feb. 5, 1966   2 Sheets-Sheet 1

INVENTOR.
James R. Stasieluk
BY Edward L. Jurow
Atty.

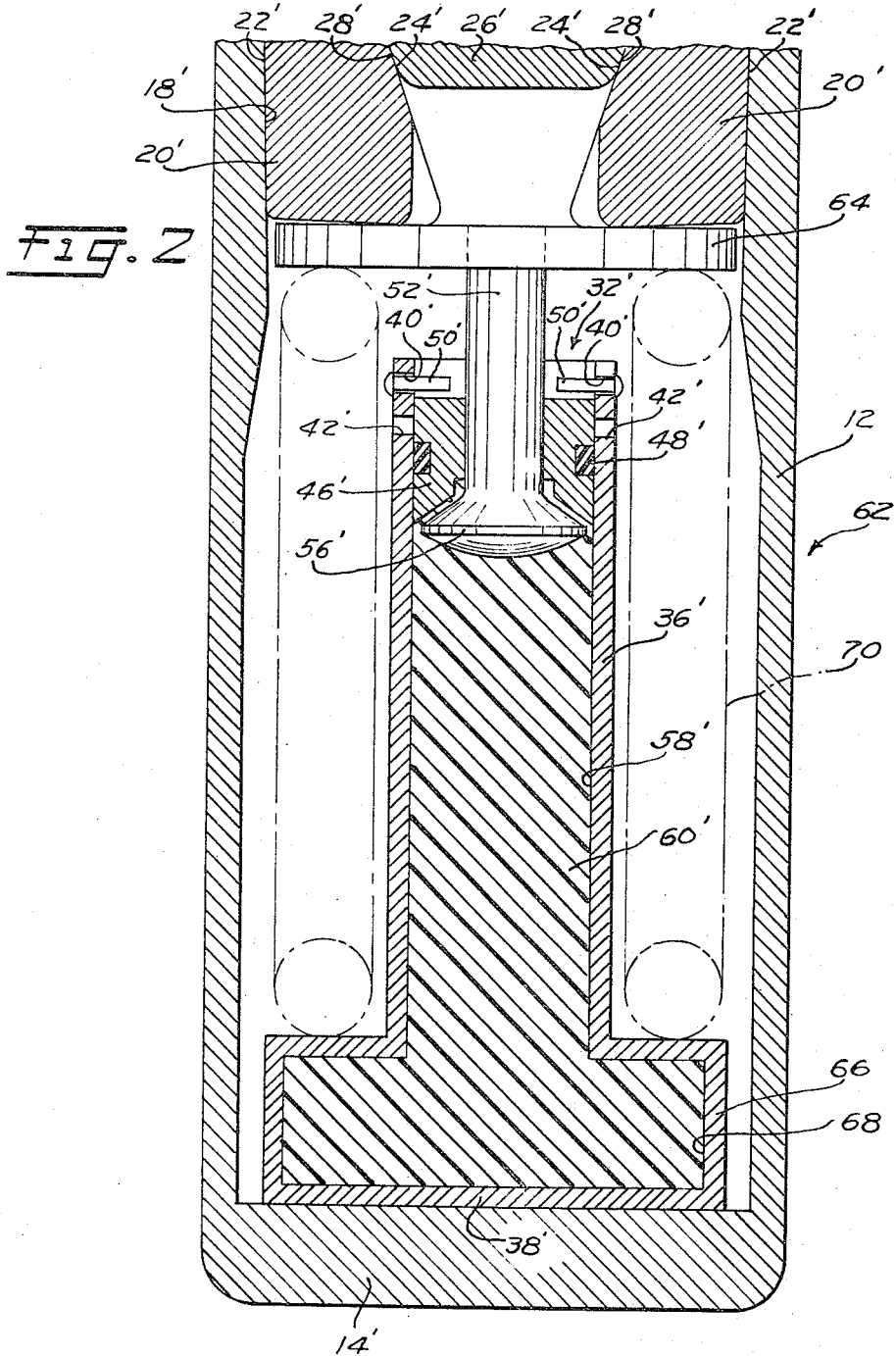

United States Patent Office 3,379,319
Patented Apr. 23, 1968

3,379,319
DRAFT GEAR
James R. Stasieluk, Chicago, Ill., assignor to W. H. Miner, Inc., Chicago, Ill., a corporation of Delaware
Filed Feb. 3, 1966, Ser. No. 524,906
2 Claims. (Cl. 213—22)

ABSTRACT OF THE DISCLOSURE

A friction draft gear wherein inward movement of the friction shoes of a friction clutch as a result of impact forces applied thereto is cooperatively opposed by a damped spring and a coil spring disposed externally of the damped spring with each being independently engageable with said friction shoes whereby upon removal of such impact forces the friction clutch is immediately returned to its normal position by the coil spring independently of the return of the damped spring to its normal position. The damped spring is characterized by a casing containing a confined volume of a compressible solid and by a piston having a peripheral orifice disposed in the casing with the piston rod thereof extending outwardly of the casing for engagement by the friction shoes, whereby to provide a damping and spring force as impact forces are imparted to the piston rod by the friction shoes as a result of a reduction in volume of the compressible solid due to inward movement of the piston rod as well as metering of the compressible solid through the piston orifice.

Figure 1:
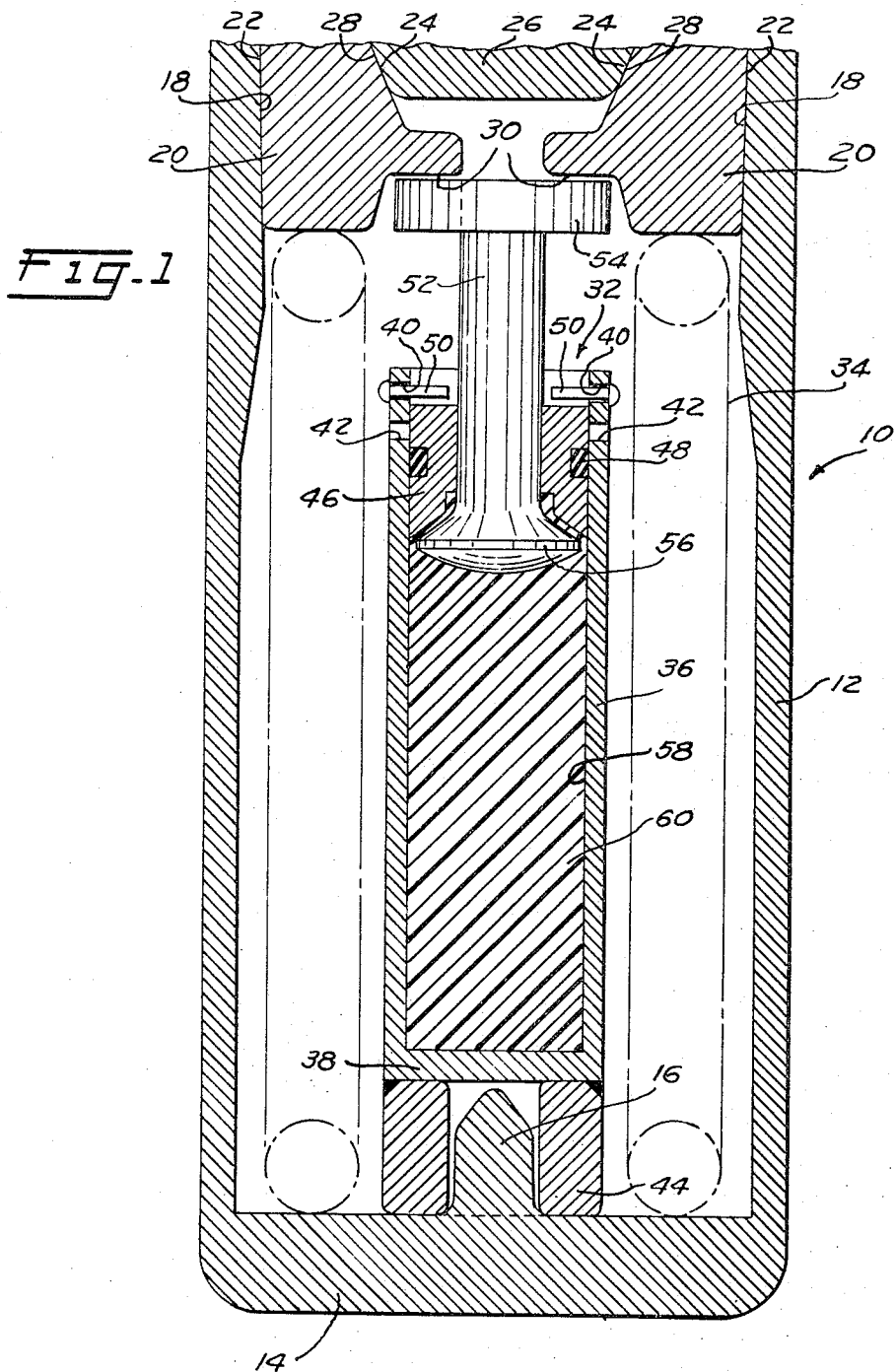

My present invention relates generally to a draft gear and more particularly to novel embodiments of a friction draft gear.

A friction draft gear, in general, comprises an elongated housing having a closed end and an open end, friction shoes at the open end of the housing, a wedge member engaging the friction shoes and arranged for actuating the same in response to impact forces, and means within the housing cooperatively arranged to dissipate the energy of impact forces transmitted through the wedge member and the friction shoes. Heretofore, a pair of concentric coil springs has customarily constituted the energy dissipating means.

It is an object of my present invention to provide a friction draft gear wherein the energy dissipating means comprises, in combination, a damped spring and a concentric coil spring. More specifically, the damped spring comprises an elongated casing having a chamber therein; a piston rod extending outwardly of the chamber and the casing for receiving, along with the coil spring, impact forces transmitted through the wedge member and the friction shoes; and a piston at the end of the piston rod within the chamber. The periphery of the piston is spaced from the interior of the chamber to define an orifice therebetween, and the chamber is filled with a compressible solid. As the piston rod moves into the chamber in response to impact forces, the reduction in volume of the compressible solid, and the throttling effect produced by the compressible solid being forced through the orifice, impose a damping and spring force on the piston rod and the piston.

It is another object of my present invention to provide an embodiment of friction draft gear of the general combination described wherein the piston rod and the coil spring independently engage the friction shoes.

It is another object of my present invention to provide an embodiment of friction draft gear of the general combination described wherein the piston rod includes a piston cap that engages the friction shoes, and wherein the coil spring engages the piston cap for imposing an auxiliary return spring force on the damped spring.

It is a further object of my present invention to provide an embodiment of friction draft gear of the general combination described wherein the casing of the damped spring has an enlarged end section defining a cavity that serves as an extension of the chamber of the damped spring. The total effective volume of the chamber, the pressure of the compressible solid in the chamber, and, hence, the overall spring and damping characteristics of the damped spring, are a function of the size of the cavity.

It is a still further object of my present invention to provide an embodiment of friction draft gear of the general combination described wherein an axially slidable collar is provided at the open end of the casing of the damped spring for slidably guiding and sealing the piston rod, and wherein means are provided for limiting movement of the collar in a direction outwardly of the casing.

Now in order to acquaint those skilled in the art with the manner of constructing and using draft gears in accordance with the principles of my present invention, I shall describe in connection with the accompanying drawings, preferred embodiments of my invention.

In the drawings:

FIGURE 1 is a longitudinal median sectional view, with one end portion being broken away, of a friction draft gear incorporating the principles of my present invention; and FIGURE 2 is a longitudinal median sectional view, with one end portion being broken away, of another embodiment of friction draft gear incorporating the principles of my present invention.

Referring now to FIGURE 1, there is shown one embodiment of friction draft gear of my present invention identified generally by the reference numeral 10. The friction draft gear 10 includes an elongated housing 12, one end of which is closed by an end wall 14 having a central inwardly extending projection 16, and the open end of which is provided with inner friction surfaces 18. Three wing-like friction shoes 20 are disposed in the open end of the housing 12 in a circumferentially spaced relationship. The shoes 20 have external friction surfaces 22 that are complementary to the friction surfaces 18 of the housing 12. Also, tapered inner friction surfaces 24 of the shoes 20 define an outwardly open six-sided pocket for receiving the inner end of a wedge member 26. The inner end of the wedge 26 is characterized by six circumferentially arranged external friction surfaces 28 which converge sharply in a direction inwardly of the housing 12 and are in continuous complementary engagement with the inner friction surfaces 24 of the shoes 20. The inner ends of the friction shoes 20 are formed with recesses 30.

Cooperating with the friction shoes 20 and the wedge 26, which constitute a friction clutch, are a damped spring, indicated generally by the reference numeral 32, and a concentric coil spring 34, arranged lengthwise in the housing 12. The damped spring 32 and the coil spring 34 serve to dissipate the energy of impact forces transmitted through the wedge member 26 and the friction shoes 20. That is, when buff or draft forces are applied to the draft gear 10, the wedge 26, and correspondingly the friction shoes 20, are moved relatively inwardly of the housing 12. The damped spring 32 and the coil spring 34 resist longitudinal inward movement of the friction shoes 20 whereby to cushion, and absorb a portion of, the buff or draft forces. In the embodiment of my invention shown in FIGURE 1, it will be noted that the coil spring 34 at one end directly engages the friction shoes 20 and at the other end engages the end wall 14 of the housing 12.

The damped spring 32 comprises an elongated cylindrical casing 36, one end of which is closed by an end wall 38, and the other end of which is provided with axially spaced sets of opposed radial apertures 40 and 42. The end wall 38 has suitably secured thereto locating means 44 which cooperates with the housing projection 16 for centering the damped spring 32. Slidably mounted in the casing 36, adjacent the open end thereof, is a collar member 46 which carries an annular seal member 48 that engages the inner periphery of the casing 36. Movement of the collar member 46 in a direction outwardly of the casing 36 is limited or prevented by means of indexing pins 50 that are disposed, for example, through the casing apertures 40.

Extending through the collar member 46 is a piston rod 52 which is slidably guided and sealed thereby. The outer end of the piston rod 52 is provided with a piston cap 54 that is seated within the recesses 30 of the friction shoes 20, while the inner end of the piston rod is provided with a piston 56. The periphery of the piston 56 is spaced from the interior cylindrical surface of the casing 36 to define an annular orifice therebetween. The casing 36 and the collar member 46 serve to define a chamber 58 which is filled with a compressible solid or elastomer 60 such as silicone rubber. In FIGURE 1, the draft gear 10 is shown in its normal rest position.

In the operation of the draft gear 10, impact forces received by the wedge 26 cause the latter and the friction shoes 20 to move inwardly of the housing 12 whereupon a portion of the impact forces is dissipated as a result of the frictional interengagement of the surfaces 24 and 28, and 18 and 22. Additionally, inward movement of the friction shoes 20 serves to compress the coil spring 34 and simultaneously causes the piston rod 52 and the piston 56 to move inwardly of the chamber 58. During the latter movement, the collar member 46 abuts the indexing pins 50, and the compressible solid 60 is forced through the annular orifice surrounding the piston 56 thereby producing a throttling effect. Also, as the piston rod 52 moves inwardly of the chamber 58, the volume of the compressible solid 60 is reduced thereby increasing the pressure therein. The described throttling effect and volume-pressure change of the compressible solid serve to dissipate the energy of the impact forces received by the piston rod 52.

When the impact forces are removed from the wedge 26, and hence from the piston rod 52, the pressure of the compressible solid 60, which is unbalanced on opposite sides of the piston 56 due to the differential in areas thereof, causes the piston 56 and piston rod 52 to return to the position shown in FIGURE 1. During the return stroke of the piston rod 52, the compressible solid flows back through the annular orifice surrounding the piston 56 to fill the space being vacated by the latter. In the circumstances outlined, the compressible solid provides a damping and spring force on the piston and piston rod. It will also be appreciated that the coil spring 34 cooperates with the damped spring 32, first, in dissipating the energy of impact forces and, then, in returning the friction shoes 20 to their axially outward rest position.

In the damped spring 32, preadjustment thereof, or preloading of the compressible solid 60, may be effected by urging the collar member 46 axially inwardly and transferring the indexing pins 50 from the casing apertures 40 to the casing apertures 42. This adjustment reduces the volume of the chamber 58 and thereby increases the pressure of the compressible solid 60. Two additional features of the present invention deserve mention at this point. First, by incorporating the damped spring 32 in an otherwise standard friction clutch-coil spring draft gear, a very substantial increase in the shock-absorbing capacity of the draft gear unit it attained, with little or no alteration of the overall draft gear design. Secondly, in the arrangement of the present invention, should the damped spring 32 fail, the draft gear would nevertheless retain some shock-absorbing capacity, because the friction clutch and the coil spring would continue to operate in a normal manner.

A modified embodiment of draft gear assembly 62 is shown in FIGURE 2. Primed reference numerals have been used to indicate parts that are the same or similar to parts identified in FIGURE 1. In the assembly 62, the piston rod 52' is provided with a piston cap 64 which has a greater radial extent than the piston cap 54. Additionally, the casing 36' is formed with a radially enlarged closed end section 66 which seats against the housing end wall 14', and which defines a cavity 68 that serves as an extension of the chamber 58'. A coil spring 70 is located concentrically about the damped spring 32', with one end engaging the piston cap 64 and with the other end engaging the enlarged casing end section 66. The coil spring 70 is similar to the coil spring 34 but is of shorter axial extent. By arranging the coil spring 70 in the manner described, an auxiliary spring force is imposed on the damped spring 32' whereby to assist in returning the piston 56' and piston rod 52' to their normal rest position. Thus, the damped spring 32' is afforded a positive return to free height following removal or dissipation of an impact force. By reason of the enlarged casing end section 66, the operating characteristics of the damped spring 32' differ from those of the damped spring 32. More specifically, the over-all spring and damping characteristics of the damped spring 32' are a function of the pressure of the compressible solid 60' and the total effective volume of the chamber 58'. The latter factor is determined, in part, by the size of the cavity 68. Thus, the presence of the cavity 68 affects the operating characteristics of the damped spring 32', and a change in the size of the cavity will effect a change in operating characteristics. Finally, except as otherwise specifically indicated, the draft gear 62 functions in the same manner, and offers the same features and advantages, as the draft gear 10.

Although not shown in the drawings, it is believed self-evident that the coil springs 34 and 70 may be replaced by elastomeric pads having appropriate central openings formed therein to permit same to be fitted concentrically over the damped springs 32 and 32'.

With regard to the embodiment of FIG. 2, it is noted that during the return stroke of the piston 56', as a result of the compressible solid being metered in the opposite direction through the annular orifice, any undesirable rebound effect of the coil spring or elastomeric pads will be effectively dampened.

While I have shown and described what I believe to be preferred embodiments of my present invention, it will be understood by those skilled in the art that various rearrangements and modifications may be made therein without departing from the spirit and scope of my invention.

I claim:
1. In a friction draft gear of the type comprising an elongated housing having a closed end and an open end, and a friction clutch at the open end of the housing characterized by a series of friction shoes and a wedge member engaging the friction shoes and arranged for actuating same in response to impact forces, the combination of a damped spring disposed in said housing inwardly of said friction clutch and characterized by an elongated casing having a chamber therein, by a piston rod extending outwardly of said chamber and said casing for normal engagement with said friction shoes whereby to receive impact forces transmitted through said wedge member and said friction shoes, by a piston at the end of said piston rod within said chamber, the periphery of said piston being spaced from the interior of said chamber to define an annular orifice therebetween, and by a compressible solid filling said chamber for providing a damping and spring force on said piston as said piston rod moves into said chamber and reduces the volume of said compressible solid with the latter being metered through said annular orifice, and a coil spring disposed within said housing externally of said damped spring casing and acting independently of said piston rod between said friction shoes and said closed end of said housing, said damped spring and said coil spring cooperatively serving to dis- sipate the energy of impact forces transmitted through said wedge member and said friction shoes, and said coil spring upon release of said impact forces serving to immediately return said friction clutch to its normal position independently of the return of said damped spring to its normal position.

2. The combination of claim 1, wherein said damped spring casing has a laterally enlarged inner end portion disposed against the closed end of said housing whereby to accommodate a greater volume of said compressible solid without increasing the longitudinal dimension of either said housing or said damped spring casing.

References Cited

UNITED STATES PATENTS

| | | | |
|---|---|---|---|
| 2,242,413 | 5/1941 | Blattner | 231—40 |
| 2,554,606 | 5/1951 | Withall | 213—32 |
| 2,667,277 | 1/1954 | Mulcahy | 213—32 |
| 3,178,036 | 4/1965 | Cardwell | 213—40 |
| 3,178,037 | 4/1965 | Kendall | 213—40 |

ARTHUR L. LA POINT, *Primary Examiner.*

DRAYTON E. HOFFMAN, *Examiner.*